Nov. 5, 1968 — F. A. GUERTH — 3,409,884
POSITION DETERMINING SYSTEM UTILIZING MAGNETIC RECORDING
Filed Oct. 23, 1965
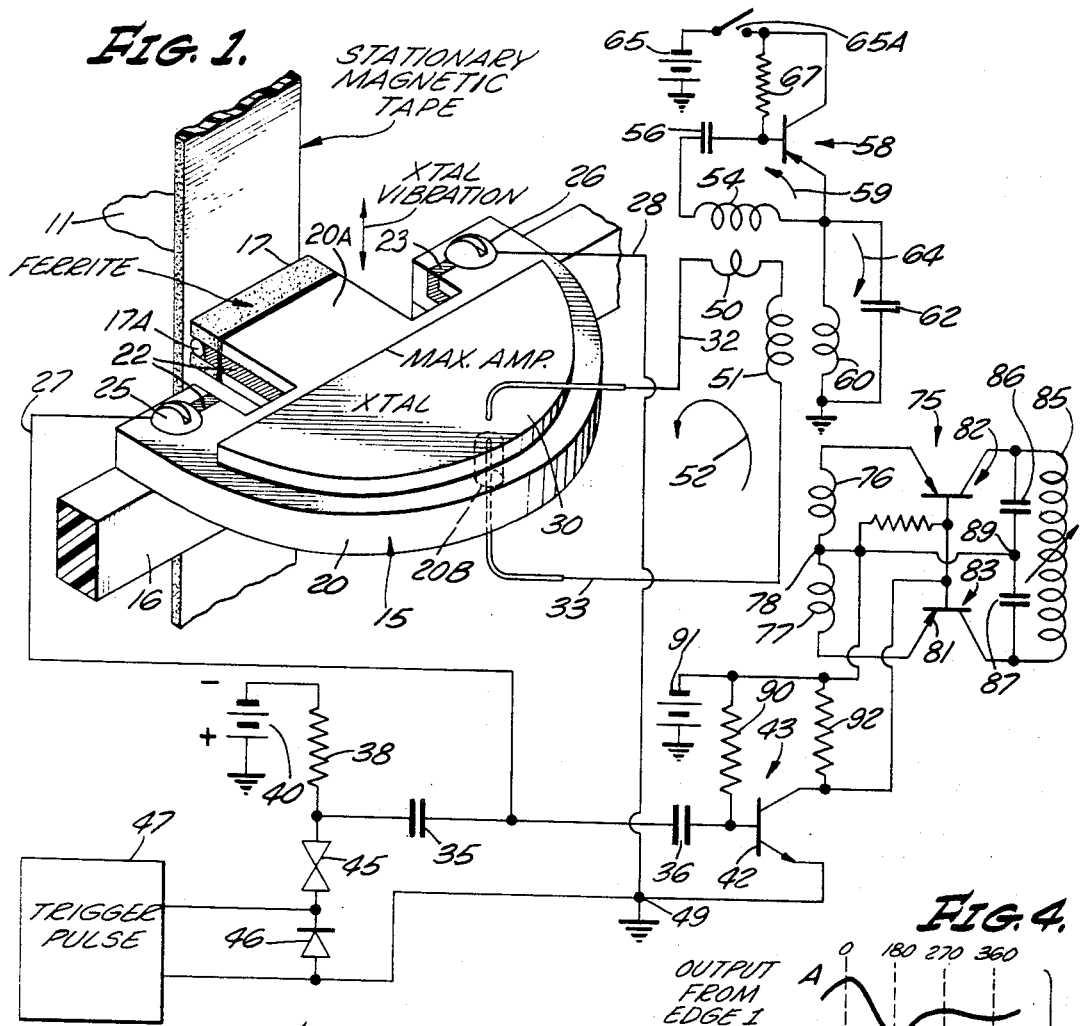
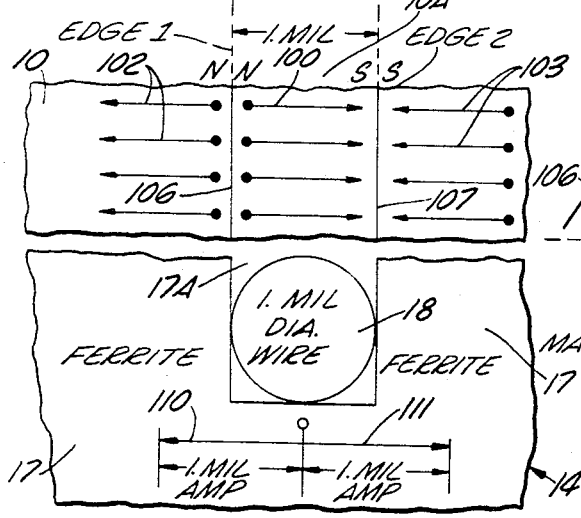
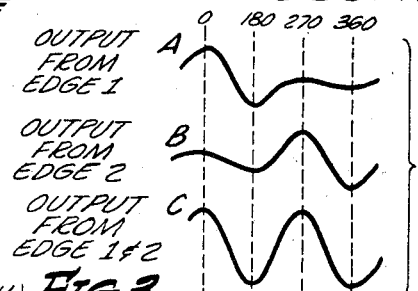
INVENTOR.
FRITZ A. GUERTH
BY
Lyon & Lyon
ATTORNEYS

# United States Patent Office 3,409,884
Patented Nov. 5, 1968

3,409,884
POSITION DETERMINING SYSTEM UTILIZING MAGNETIC RECORDING
Fritz A. Guerth, San Pedro, Calif., assignor to G.L. Collins Corporation, a corporation of California
Filed Oct. 23, 1965, Ser. No. 504,047
11 Claims. (Cl. 340—174.1)

ABSTRACT OF THE DISCLOSURE

A position determining system involves a magnetic tape of standard construction and is maintained stationarily on a body whose position is to be accurately established and re-established. Incorporated with such magnetic tape is a vibrating ferrite structure, vibrated at a supersonic frequency by a crystal having that inherent frequency. The ferrite structure includes a grooved portion within which there is a wire extending transversely of the magnetic tape. Initially, a positioning marker is established on the tape by passing a current through the wire in a non-vibrating condition of the ferrite structure. This positioning marker is subsequently used in conjunction with the same wire, but now in a vibrating condition to relocate accurately the position of the body on which the tape is mounted. For this latter purpose, the wire is connected to detecting apparatus which is sensitive both to the frequency of vibration and also to the voltage generated in the wire to accurately relocate the position marker with respect to that wire which was initially used in establishing the position marker.

---

The present invention relates to improved means and techniques for accurately establishing positions.

Briefly, the system described herein involves a magnetizable medium such as for example, a magnetic tape of standard construction which, however, is maintained relatively stationary on a body whose position is to be accurately established and reestablished. Cooperating with such magnetic tape is a vibrating ferrite structure, vibrated at a supersonic frequency by a crystal having that inherent frequency. The ferrite structure includes a grooved portion of approximately $3/1000$ of an inch (.003″) depth and $1/1000$ of an inch (1 mil) width; and within such grooved portion there is a wire having a diameter of one mil extending, as does the grooved portion, transversely of the magnetic tape, the tape having a width of, for example, ¼ of an inch. Initially, a positioning marker is established on the tape by passing a current through the wire in a nonvibrating condition of the ferrite structure. This position marker is subsequently used in conjunction with the same wire and ferrite grooved portion, but now in a vibrating condition, to relocate accurately the position of the body on which the tape is mounted.

For this latter purpose, the wire is connected to detecting apparatus in the nature of a discriminator which is sensitive both to the frequency of vibration of the crystal and also to the voltage generated in the wire to thereby detect characteristic features of the previously recorded position marker and use the same in accurately relocating the position marker with respect to that wire which was initially used in establishing the position marker.

It is therefore a general object of the present invention to provide a system of the character indicated above.

A specific object of the present invention is to provide apparatus capable of marking and relocating a position with a high degree of accuracy.

Another specific object of the present invention is to provide the improved means and techniques for accurately establishing the position of a device with respect to a magnetic position marker.

Another specific object of the present invention is to provide apparatus of this character capable of being used in conjunction with various machine tools, electrical and mechanical devices and instruments in accurately establishing relative positions and locations of various elements of the same.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a system embodying features of the present invention;

FIGURE 2 illustrates on an enlarged scale different physical and magnetic relationships;

FIGURE 3 illustrates the magnetization between the edges of the tape shown in FIGURES 1 and 2;

FIGURE 4 illustrates the voltage output obtained under different conditions using the system shown in FIGURE 1.

FIGURE 5 illustrates another wave form developed in the system.

The system shown in FIGURE 1 includes an elongated magnetizable element such as, for example, a standard ¼-inch wide magnetic tape 10 used in present-day recording equipment. However, in this instance, the tape 10 is maintained in a relatively stationary condition on a body 11 whose position is to be accurately established. Such body 11 may, for example, be an adjustable bed of a machine tool whose position is to be accurately established in its adjustment by conventional means. Magnetically associated with the tape 10 is a ferrite structure 14 which is capable of being vibrated by a crystal structure 15 mounted on a stationary supporting structure 16, the structures 11 and 16 being relatively movable with respect to each other.

The ferrite structure 14 includes generally a rectangular block of ferrite material 17 within which is formed an open-ended rectangular grooved portion 17A (FIGURES 1 and 2) with a wire 18 extending through the full length of the grooved portion 17A. This ferrite block 17 which has a length substantially equal to the width of the magnetic tape 10 is affixed, for example, as by epoxy cement along one surface thereof, to an adjacent surface of a tongue portion 20A of a fiberglass base member 20. Opposite ends of the aforementioned wire 18 are connected via a copper coating 22 and 23 (deposited, for example, by electrolytic action) to fastening screws 25, 26 which are illustrated as being also terminals for the wires 27 and 28 respectively.

The crystal material 30 in the form of a half a disc is cemented along one of its surfaces to the adjacent surface of the semidisc portion of the fiberglass base member 20. One side of the crystal 30 is connected to the conductor 32, the other side of the crystal being connected to conductor 33, such conductor extending upwardly through an apertured portion 20B of the base material 20.

The previously mentioned conductor 28 is grounded and the conductor 27 is connected to one terminal of each of the capacitors 35 and 36, the other treminal of capacitor 35 being connected through resistance 38 to the negative ungrounded terminal of voltage source 40; and the other terminal of capacitor 36 is connected to the base electrode 42 of transistor amplifier 43 having its emitter electrode grounded.

The wire 18 within the ferrite block 17 is used both for "recording" and for "reproduction" and the system shown in FIGURE 1 incorporates electronic switching involving the avalanche diode 45, diode 46 and trigger pulse source 47 for that purpose.

The diodes 45 and 46 are connected in a series circuit extending from the junction point of capacitor 35 and resistance 38 to the grounded or reference potential point 49. One terminal of the trigger source 47 is grounded and the other terminal is connected to the junction point of diodes 45 and 46. The source 47 when operative develops the positive pulse and applies the same to the junction point of diodes 45 and 46.

In operation of this switching circuit the capacitor 35 is charged through resistor 38 from a voltage source 40 of, for example, 30 volts. When it is desired to record a position marker on the tape 10 this capacitor 35 is discharged and such discharge of capacitor 35 for that purpose occurs through the avalanche diode 45, diode 46 and "head" wire 18. Triggering for this discharge of capacitor 35 may be accomplished by increasing the supply voltage 40 to the breakdown voltage of the diode 45 (pulse chain) or as illustrated by applying a pulse across diode 46. Since the impedance of the avalanche diode 45, when not conducting, is in the range of megons, the recording portion of the circuit involving capacitor 36 and transistor amplifier 43 is effectively isolated during playback.

This switching arrangement is very advantageous considering particularly that there is involved here a low impedance head involving only one length of wire 18, and also because of low impedance considerations, contact resistances become a problem when attempts are made to use a mechanical switch for this purpose. In this case the circuit elements are very small and therefore can be mounted close to the head in preventing losses, this being particularly important with multichannel heads.

The position marker 10A characterized by edge portions, edge 1 and edge 2 (FIGURE 2) thus established on tape 10 by discharge of capacitor 35 may subsequently be accurately detected, position-wise, using the ferrite structure in a vibrating condition. During the marking of tape 10, the ferrite structure 14 is stationary but during its subsequent detection, the structure 14 is vibrated using the crystal 30 which is connected in an oscillator in a manner now described.

The crystal leads 32 and 33 are connected in a series circuit with a small coil 50 and a larger coil 51 to form what is termed herein as a crystal loop as indicated by the curved arrow 52. A coil 54 having more turns than coil 50 is magnetically coupled thereto and is connected in a series circuit with a capacitor 56 and the base and emitter electrodes of transistor 58 in what is termed herein as a base loop as indicated by the curved arrow 59. A coil 60 having less turns than coil 51 is coupled thereto and is connected in a series circuit with a capacitor 62 with one terminal of the capacitor 62 being grounded and the other terminal being connected to the emitter electrode of transistor 58 and this series circuit is referred to as an emitter loop as indicated by the curved arrow 64.

The collector electrode of transistor 38 is connected through switch 65A to the negative ungrounded terminal of voltage source 65 and also to one terminal of resistor 67 having its other terminal connected to the junction point of capacitor 56 with the base electrode of transistor 58.

With the oscillator switch 65A closed the oscillator circuit is then energized and the crystal element 30 vibrates at its inherent resonant frequency. This is assured by proper phasing of the emitter and base coils 54 and 60 respectively. Without proper phasing of these two coils there is transistor oscillation as distinct from crystal oscillation.

The inherent frequency of the crystal 30 in one practical working case was 17 kilocycles. The frequency of the loop 59 (with open transistor base) was 22 kilocycles; and the resonant frequency of the emitter loop 60 was 16 kilocycles.

In operation of this oscillator circuit, optimum mechanical output from the crystal is very close to the maximum current flow in the crystal loop 52. This current, coupled into the high inductive base loop 59 drives the base of the transistor 58 to a positive voltage for a short time interval thereby interrupting the emitter current for a small fraction of the time in each cycle as indicated in FIGURE 5 representing the corresponding voltage variation at the base of the transistor.

The resulting small peak 70 appearing in the voltage wave 71 shown in FIGURE 5 acts as a synchronization pulse.

The base and emitter loops 64 and 59 respectively are adjusted for efficient phasing of the generated sine wave with the coils 54 and 60 being connected to counteract each other to thereby prevent the emitter loop 59 from oscillating in its preferred frequency mood and thereby also allowing the crystal 30 to dominate the oscillation frequency.

The base loop circuit 64 is automatically tuned by switching the circuit during each cycle between the two frequencies 16 kilocycles and 22 kilocycles representing respectively the frequency of operation when the base of transistor 58 is conductive and nonconductive. For proper operation, the emitter loop 57 is tuned below and the base loop 64 is tuned above the 17 kilocycle frequency of the crystal 30.

The advantages of this particular oscillator circuit is that there is a large amount of mechanical output developed with low distortion this being due to the narrow synchronization pulse 70. Also it is noted that the circuit provides fast switching response in that when the crystal oscillator is interrupted by shorting out the crystal, the oscillator remains oscillating.

The crystal 30 oscillates in a direction corresponding to its shortest dimension with the amplitude of oscillation being greatest at that region where the tongue member extends from its base portion 20, such tongue member 20A indeed acting as a mechanical amplifier whereby the amplitude of oscillations of the ferrite structure 14 are further increased because of the length of the tongue member 20A.

Since the wire 18 of the ferrite structure is vibrated relative to the edges (edge 1 and edge 2, FIGURE 2) that define the position marker 10A in medium 10 a voltage is developed in wire 18 and such voltage is applied through capacitor 36 to the base electrode of transistor 43 for amplification and subsequent application to a discriminator network 75 to which is also applied a voltage derived from the previously-mentioned oscillator circuit.

For the above-indicated purposes the discriminator network has two coils 76, 77 serially connected and magnetically coupled to the coils 51 and 60. The discriminator coils 76, 77 are interconnected at the junction point 78 with the outside terminals of such coils being connected respectively to the transistor emitter electrodes 80 and 81 having their associated base electrodes interconnected. The collector electrodes of transistors 82 and 83 are connected in series with the coils of a differential meter 85, such coils being shunted by a pair of capacitors 86 and 87 having their junction point 89 connected to the previously-mentioned junction point 78.

The transistor 43 has its collector electrode connected to the interconnected base electrode of transistors 82 and 83 and such collector electrode is also connected through resistor 90 to the ungrounded terminal of voltage source 91. A resistor 92 is connected between the base electrode of transistor 43 and the ungrounded terminal source 91.

FIGURE 2 illustrates in general form the relationship between the magnetically produced marker 10A on the tape 10 and the ferrite body 17 containing the wire 18, such magnetic marker 10A being produced in the tape 10 by passage of a capacitor discharge current through the wire 18. The passage of this current of course produces a unidirectional magnetic flux which results in orientation of the magnetized particles in the tape 10 in the direction indicated by the series of arrows 100, illustrated as extending from left to right in FIGURE 2. This resulting magnetization disturbs the original orientation of the magnetic particles in the tape, such original orientation being represented by the series of arrows 102 and 103, each series 102, 103 being illustrated as extending from the left to the right in FIGURE 2. Thus, as illustrated, there is a discontinuity in the regions designated by the lines 106 and 107, the lines 106 and 107 being referred to also as "Edge 1" and "Edge 2" respectively. It is these two edges defined by lines 106 and 107 which are sensed and detected in subsequent repositioning of the apparatus in those instances where the body carrying the tape 10 is relocated with respect to that body carrying the ferrite core 17, all as previously indicated in the discussion of FIGURE 1.

It will be observed that in this relocation the change in magnetic flux is sensed at the edges of the gap resulting from the change in permeability and not in the gap per se. Indeed, the vibrating wire 18 receives two outputs, one from each discontinuity, namely, from each edge as indicated in FIGURE 4 wherein the output from edge 1 and output from edge 2 is represented respectively at A and B in FIGURE 4. The representation C in FIGURE 4 is the composite output from the two edges. In this detection and relocation process the ferrite 17 of course is vibrating and voltages are developed in the single straight wire 18 in accordance with that movement and the particular position of the wire 18 at that particular time with respect to the edges 106 and 107. In such detection process the ferrite 17 may either contact the magnetized layer of the tape 10 or be spaced a slight distance therefrom. The grooved portion 17A in the ferrite 17 has a depth of, for example, 3 mils so that the 1 mil diameter wire does not extend beyond the confines of the ferrite. As also indicated in FIGURE 2, the amplitude of vibration of the wire, as indicated by the arrows 110 and 111, is greater than the diameter of the wire and in this case is illustrated as having an amplitude of 1 mil, i.e., the total excursion from peak to peak is 2 mils. Because there are essentially two outputs developed, one is balanced against the other in establishing a center position midway between the edges from which the two outputs are developed, this being the general function of the discriminator network 75 in which the meter 85 indicates that position. The indicator 85 reads zero output, i.e., a balanced output, when the wire 18 is positioned so as to vibrate from its main or center position illustrated in FIGURE 2.

It will also be seen from the foregoing that before recording all magnetic particles in the tape 10 are oriented in one direction and that the marker line 10A is located by orienting the particles between the edges 106 and 107 of the gap in the opposite direction producing a resulting magnetization illustrated in FIGURE 3. The two edges of the recorded lines 106, 107 may be defined as a north wall and a south wall as indicated by the letters N and S in FIGURE 2. When at "playback," the edges of the head gap, i.e., the opposite walls of the grooved portion 17A, and the edges 106 and 107 of the recorded "line" are exactly opposite, the indicator 85 reads zero. In any other position the output from the head, i.e., the unbalanced current indicated by indicator 85, has some finite value and may be used to indicate whether the center position of the vibrating ferrite 17 is either too far to the right or too far to the left of a particular one of the lines 106, 107. It will be further seen that the variation C in FIGURE 4 represents a second harmonic vibration of the vibrating frequency, namely, the periodicity of the variation C in FIGURE 4 corresponds to 34 kilocycles when the frequency of the crystal 30 is 17 kilocycles. Because slight movements off center are due to change in amplitude and phase, a center position can be indicated by display with a cathode ray tube tuning indicator or with a discriminator and null meter as shown in FIGURE 1. Since the output is always a frequency related to the vibration frequency, noise can be eliminated through filtering so that therefore very low output signals may be amplified.

Various types of crystals may be used for the crystal 30, for example, the crystal 30 may be barium titonate or lead zirconate. Either a single semidisc of this material may be used or two semidiscs oppositely polarized and conductive may be glued together. In the arrangement shown, the amplitude of vibration of the crystal is maximum at the point indicated by "MAX" and it will be observed that the tongue member 20A amplifies, through lever action, such vibration and is thus referred to as a mechanical amplifier. The arrangement shown in FIGURE 1 is capable of developing oscillations at the frequency of the crystal 30 with amplitudes comparable with and greater than the diameter of the wire 18 for these purposes.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. In a position-determining system, a body whose position is to be established, a magnetizable medium that is stationary with respect to said body; a magnetic structure magnetically related to said medium; said structure including a single length of wire; and means for vibrating said magnetic structure in a direction extending transversely of the longitudinal axis of said wire and with an amplitude substantially equal to the diameter of said wire, said wire functioning as a read head and being vibrated with respect to a reference signal recorded on said medium in order to establish the position of said body.

2. A system as set forth in claim 1 in which said wire is within an open-ended slot formed in a second magnetizable medium which is magnetically related to said first medium; said slot having a width substantially equal to the diameter of said wire.

3. A system as set forth in claim 2 in which said second magnetizable medium is mounted on a vibratile crystal.

4. A system as set forth in claim 3 in which said crystal is of generally circular shape with maximum vibrational excursions occurring near a central portion of the same; said second magnetizable medium being on the end of a radially-extending portion of said crystal.

5. A system as set forth in claim 1 including means for disabling said vibrating means; and means for passing current through said wire to produce a magnetized region in said first medium of a width and length substantially equal respectively to the diameter and length of said wire.

6. A system as set forth in claim 1 in which said vibrating means includes a crystal; a first winding; a second winding; a first series circuit comprising said crystal, said first winding and said second winding; a third winding coupled to said first winding; a fourth winding coupled to said second winding; a transistor having a base, a collector and an emitter; a point of reference potential; a resistor connected between said base and collector; a source of potential having one of its terminals connected to said point and the other one of its terminals connected to said collector; a first capacitor; said first capacitor and said third winding being connected in a series circuit and between said emitter and said base; a second capacitor connected in a parallel circuit with said fourth winding; one terminal of said parallel circuit being connected to said reference point and the other terminal of said parallel circuit being connected to said emitter.

7. In a position-determining system, a body whose position is to be established, a magnetizable medium that is stationary, with respect to said body; a magnetic structure magnetically related to said medium; said structure including a single length of wire spaced from and extending generally parallel with a face of said medium for producing a magnetized region in said face with said region having a width and a length substantially equal respectively to the diameter and length of said wire when a current is passed through said wire; means for vibrating said wire adjacent said magnetized region and with an amplitude substantially equal to the diameter of the wire; and means coupled to said wire for indicating a voltage developed in said wire when vibrated by said vibrating means adjacent to said magnetized region, said wire functioning as a read head and being vibrated with respect to a reference signal recorded on said medium in order to establish the position of said body.

8. A system as set forth in claim 7 including voltage amplification means; a source of magnetizing current; and switching means alternatively effective to connect said wire to either said source or to said amplification means.

9. A system as set forth in claim 8 in which said switching means includes a first diode and a second diode; a capacitor; a point of reference potential; one end of said wire being connected to said point; the other end of said wire being connected to one terminal of said capacitor; the other terminal of said capacitor being connected at a first junction to one terminal of said first diode; the other terminal of said first diode having its other terminal connected at a second junction with one terminal of said second diode; the other terminal of said second diode being connected to said point; a trigger pulse source having one of its terminals connected to said point and the other one of its terminals connected to said second junction; a source of voltage; a resistor; one terminal of said voltage source being connected to said point; the other terminal of said source being connected to one terminal of said resistor; the other terminal of said resistor being connected to said first junction; operation of said trigger source serving to render said second diode conductive to cause said capacitor to be discharged through a path which includes said wire and said first and second diodes.

10. In a system wherein it is desired to use an element either as a magnetizing element or as a voltage producing element, a source of magnetizing current; voltage amplification means; a capacitor; a point of reference potential; one terminal of said element and one input terminal of said amplification means and one terminal of said magnetizing source each being connected to said point; the other input terminal of said amplification means being connected to one terminal of said capacitor; a pair of serially connected diodes connected in a series circuit; one terminal of said series circuit being connected to said point; the other terminal of said series circuit being connected to the other terminal of said current source and also to the other terminal of said capacitor; and means for rendering said series circuit alternatively conductive or nonconductive.

11. An oscillator circuit including a crystal; a first winding; a second winding; a first series circuit comprising said crystal, said first winding and said second winding; a third winding coupled to said first winding; a fourth winding coupled to said third winding; a transistor having a base, an emitter, and a collector; a point of reference potential; a voltage source connected between said point and said collector; a first capacitor; said first capacitor and said third winding being connected in a series circuit, one terminal of which is connected to said emitter and the other terminal of which is connected to said base; a second capacitor connected in parallel with said fourth winding to form a parallel circuit having one of its terminals connected to said point and the other one of its terminals connected to said emitter.

References Cited

UNITED STATES PATENTS

| | | | |
|---|---|---|---|
| 3,271,751 | 9/1966 | Proebster | 340—174.1 |
| 3,185,972 | 5/1965 | Sippel | 340—174.1 |
| 3,289,190 | 11/1966 | Guerth | 179—100.2 |
| 2,862,066 | 11/1958 | Thiele | 179—100.2 |
| 2,756,276 | 7/1956 | Gratian et al. | 179—100.2 |
| 2,532,100 | 11/1950 | Howell | 179—100.2 |

BERNARD KONICK, *Primary Examiner.*

A. I. NEUSTADT, *Assistant Examiner.*